(12) United States Patent
McColloch (10) Patent No.: US 9,112,616 B2
(45) Date of Patent: Aug. 18, 2015

(54) TRANSCEIVER SYSTEM ON A CARD FOR SIMULTANEOUSLY TRANSMITTING AND RECEIVING INFORMATION AT A RATE EQUAL TO OR GREATER THAN APPROXIMATELY ONE TERABIT PER SECOND

(75) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1442 days.

(21) Appl. No.: 12/190,884

(22) Filed: Aug. 13, 2008

(65) Prior Publication Data

US 2010/0284698 A1    Nov. 11, 2010

(51) Int. Cl.
*H04B 10/00* (2013.01)
*H04B 10/80* (2013.01)
*H04B 10/43* (2013.01)
*H04B 10/40* (2013.01)
*G02B 6/42* (2006.01)

(52) U.S. Cl.
CPC ............ *H04B 10/801* (2013.01); *G02B 6/4201* (2013.01); *G02B 6/4246* (2013.01); *H04B 10/40* (2013.01); *H04B 10/43* (2013.01); *G02B 6/4249* (2013.01)

(58) Field of Classification Search
USPC .................................................. 398/135–139
See application file for complete search history.

(56) References Cited

U.S. PATENT DOCUMENTS

| | | | | |
|---|---|---|---|---|
| 5,220,724 A | * | 6/1993 | Gerstner | 29/840 |
| 5,432,630 A | * | 7/1995 | Lebby et al. | 398/116 |
| 6,348,986 B1 | * | 2/2002 | Doucet et al. | 398/128 |
| 7,470,069 B1 | * | 12/2008 | Offrein et al. | 385/88 |
| 2002/0117764 A1 | * | 8/2002 | Huang | 257/796 |
| 2002/0126964 A1 | * | 9/2002 | Blom et al. | 385/88 |
| 2003/0031440 A1 | * | 2/2003 | Dennis et al. | 385/123 |
| 2004/0086240 A1 | * | 5/2004 | Togami et al. | 385/92 |
| 2006/0045530 A1 | * | 3/2006 | Lim et al. | 398/135 |
| 2006/0210215 A1 | * | 9/2006 | Aoki et al. | 385/14 |
| 2006/0291785 A1 | * | 12/2006 | Epitaux et al. | 385/92 |
| 2007/0025738 A1 | * | 2/2007 | Moore | 398/189 |
| 2011/0123144 A1 | * | 5/2011 | Wang et al. | 385/14 |

FOREIGN PATENT DOCUMENTS

| | | |
|---|---|---|
| EP | 2088514 | 8/2009 |
| WO | WO-01/67144 | 9/2001 |

* cited by examiner

*Primary Examiner* — David Payne
*Assistant Examiner* — Tanya Motsinger (57) ABSTRACT

An optical transceiver system is provided that comprises multiple parallel transceiver modules that are mounted on a card. The transceiver card is small in terms of spatial dimensions, has very good heat dissipation characteristics, and is capable of simultaneously transmitting and receiving data at a rate equal to or greater than approximately one Tb per second (1 Tb/s). A plurality of the transceiver systems may be interconnected to achieve a communications hub system having even higher bandwidths. In addition, the transceiver system may be configured such that each card has a routing controller mounted thereon for performing router functions. The router functions include, for example: causing signals received by one transceiver module on the card to be routed to and transmitted by another of the transceiver modules; causing signals received by one transceiver module on the card to be retransmitted by the same transceiver module over one of it's optical transmit channels; and causing signals received by one transceiver module on the card to be routed to and transmitted by a transceiver module on a different card.

31 Claims, 9 Drawing Sheets

TRANSCEIVER SYSTEM ON A CARD FOR SIMULTANEOUSLY TRANSMITTING AND RECEIVING INFORMATION AT A RATE EQUAL TO OR GREATER THAN APPROXIMATELY ONE TERABIT PER SECOND

TECHNICAL FIELD OF THE INVENTION

The invention relates to optical communications systems. More particularly, the invention relates to a transceiver system comprising a card on which multiple parallel transceiver modules are mounted for simultaneously transmitting and receiving information at a rate equal to or greater than approximately one terabit per second.

BACKGROUND OF THE INVENTION

Figure 1:
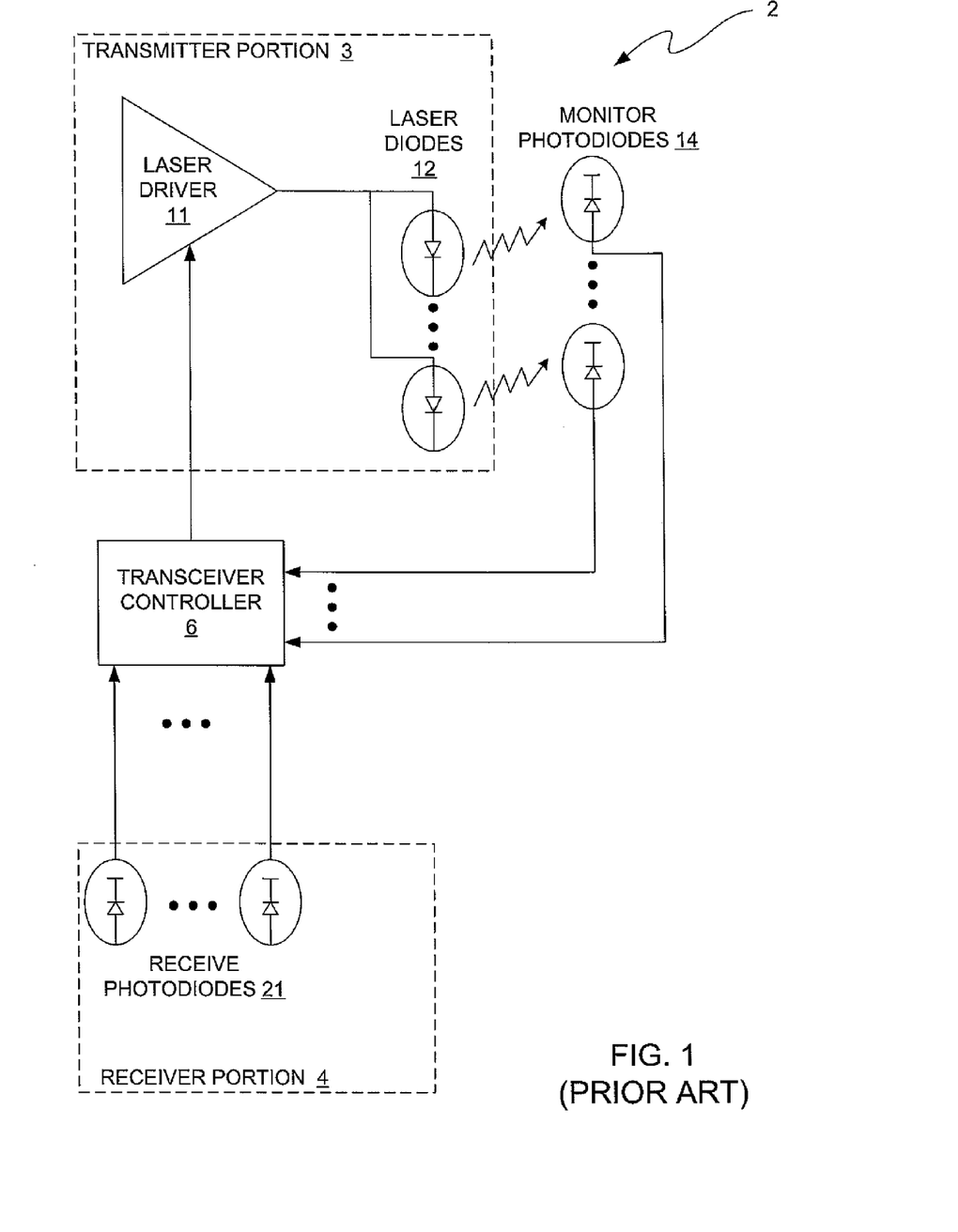
FIG. 1 illustrates a block diagram of a known transceiver module currently used in optical communications.

FIG. 1 illustrates a block diagram of a parallel transceiver module 2 currently used in optical communications, which has multiple transmit and receive channels. The transceiver module 2 includes a transmitter portion 3 a receiver portion 4. The transmitter and receiver portions 3 and 4 are controlled by a transceiver controller 6. The transmitter portion 3 comprises components for transmitting data in the form of amplitude modulated optical signals over multiple fibers (not shown). The transmitter portion includes a laser driver 11 and a plurality of laser diodes 12. The laser driver 11 outputs electrical signals to the laser diodes 12 to modulate them. When the laser diodes 12 are modulated, they output optical signals that have power levels corresponding to logic 1s and logic 0s. An optics system (not shown) of the transceiver module 2 focuses the optical signals produced by the laser diodes 12 into the ends of respective transmit optical fibers (not shown) held within a connector (not shown) that mates with the transceiver module.

Typically, a plurality of monitor photodiodes 14 monitor the output power levels of the respective laser diodes 12 and produce respective electrical feedback signals that are fed back to the transceiver controller 6, which processes them to obtain respective average output power levels for the respective laser diodes 12. The controller 6 outputs controls signals to the laser driver 11 that cause it to adjust the bias current signals output to the respective laser diodes 12 such that the average output power levels of the laser diodes are maintained at relatively constant levels.

The receiver portion 4 includes a plurality of receive photodiodes 21 that receive incoming optical signals output from the ends of respective receive optical fibers (not shown) held in the connector. The optics system (not shown) of the transceiver module 2 focuses the light output from the ends of the receive optical fibers onto the respective receive photodiodes 21. The receive photodiodes 21 convert the incoming optical signals into electrical analog signals. The transceiver controller 6 and/or other circuitry (not shown) of the transceiver module 2 processes the electrical signals to recover the data represented by the signals.

There is an ever-increasing demand in the optical communications industry for transceiver systems that are capable of simultaneously transmitting and receiving larger amounts of information. To accomplish this, it is known to combine multiple parallel transceiver modules of the type described above with reference to FIG. 1 to produce transceiver systems that have increased bandwidth. A variety of parallel transceiver modules are used in the optical communications industry for this purpose. For example, one known transceiver module of the type described above with reference to FIG. 1 includes a multi-fiber connector module known in the industry as the MTP® connector. The MTP connector module plugs into a receptacle of the transceiver module. The MTP connector module receives a duplex fiber ribbon (transmit and receive optical fibers) having a total of 4, 8, 12 or 24 optical fibers. When the MTP connector module is plugged into the receptacle, electrical contacts of the connector module are electrically connected with electrical contacts of a printed circuit board (PCB) of the transceiver module. The laser diodes and the photodiodes are integrated circuits (ICs) that are mounted on the PCB.

It is known that multiple transceiver modules of the type that use the MTP connector can be arranged in an array to provide a transceiver system that has an overall bandwidth that is generally equal to the sum of the bandwidths of the individual transceiver modules. One of the problems associated with such an array is that the MTP connectors are edge-mounted and the transceiver modules are stacked in racks. Although this type of array is a suitable solution in some scenarios for obtaining a transceiver system that has an increased bandwidth, there are limitations on the ability of such an array to achieve very large increases in bandwidth. For example, in order to obtain a transceiver system having the ability to simultaneously transmit and receive one terabit of data per second (Tb/s), the racks and cabling needed to accommodate the transceiver modules would consume so much space that the solution would be impractical in most cases. In addition, an array of this type would present heat dissipation problems, and in most cases would be prohibitively expensive.

Another parallel transceiver module that has multiple transmit and multiple receive channels is known in the optical transceiver industry as the Snap 12 transceiver module. The Snap 12 transceiver module comprises a 12-channel transmit module and a 12-channel receive module. The transmit and receive modules are mechanically coupled and electrically connected to a host PCB. Typically, the transmit and receive modules are mounted side by side on the host PCB. Each module has an array of 100 input/output (I/O) pins that plugs into a 100-pin ball grid array (BGA) of the host PCB. This type of BGA connection is commonly referred to as a mid-plane mounting connection due to the fact that I/O pins of the modules and the I/O pads of the BGA interconnect in the plane of the host PCB, or in a plane that is generally parallel to the plane of the host PCB. Thus, a mid-plane mounting connection is different from the edge-mounting connection described above with reference to the MTP connector.

The Snap 12 transceiver system has a bandwidth of 10 Gigabits (Gbs) per channel, and has a total bandwidth of 100 GB per second (Gb/s). The system is typically mounted in a box, which is connected to multiple electrical cables, which, in turn, are connected to multiple router ICs. In order to increase the total bandwidth of a Snap 12 system, multiple boxes may be used. Each of the boxes is connected to multiple cables, which, in turn, are connected to multiple router ICs. The boxes are mounted in racks. For example, to obtain a system having a total bandwidth of ½ Tb/s, a total of five Snap 12 boxes would be needed. The racks needed to accommodate this many boxes and the cables needed to interconnect the boxes to the router ICs consume a large amount of space and generate a large amount of heat. The space consumption and heat generation problems must be dealt with in order to make the system operate properly.

In addition, the Snap 12 transmit and receive modules are relatively tall (approximately 15 mm in height), which often results in the occurrence of relatively large impedance disturbances in the modules. These impedance disturbances reduce signal integrity, which limits the bandwidth efficiency of the system. In addition, each Snap 12 box is sold as a stand-alone part that is relatively expensive. Consequently, a system that is constructed of multiple boxes in order to achieve an increased bandwidth is generally very expensive.

A need exists for a transceiver system that has multiple parallel transceiver modules and that is capable of achieving large bandwidths of at least one Tb/s. A need also exists for such a transceiver system that is efficient in terms of space consumption, heat dissipation and costs. A further need exists for a transceiver system that is suitable for use as a router.

SUMMARY OF THE INVENTION

The invention is directed to an optical transceiver system that is configurable to function as a transceiver system or as a transceiver and router system, and an optical communications hub system. The optical transceiver system comprises a circuit board card and a plurality of parallel optical transceiver modules. The optical transceiver modules are mechanically coupled to the upper surface of the card. Each of the transceiver modules has electrical contacts that are electrically coupled to electrical conductors disposed on the upper surface of the card. Each respective transceiver module is connected to an end of a respective optical fiber ribbon cable comprising a plurality of optical fibers. At least some of the optical fibers are optical transmit fibers and at least some of the optical fibers are optical receive fibers. Each of the transceiver modules comprises one or both of light sources and photodetectors. Each light source is configured to generate optical transmit signals by converting electrical transmit signals comprising bits of data from the electrical domain to the optical domain. Each photodetector is configured to generate an electrical receive signal by converting an optical receive signal comprising bits of data from the optical domain to the electrical domain. Each respective transceiver module has a respective optics system for coupling the optical signals between the respective transceiver modules and the ends of the optical fibers of the respective ribbon cables. The transceiver system is configured to simultaneously transmit the optical transmit signals and receive the optical receive signals at a rate equal to or greater than approximately one Tb/s in both directions.

The optical communications hub system comprises at least first and second circuit board cards in communication with each other and at least first and second groups of multiple parallel optical transceiver modules mechanically coupled to the upper surfaces of the first and second cards, respectively. Each of the cards comprises a substrate having an upper surface and a lower surface. The first and second groups of parallel optical transceiver modules are mechanically coupled to the upper surfaces of the first and second cards, respectively. Each of the transceiver modules has electrical contacts that are electrically coupled to at least some of the electrical conductors disposed on the upper surfaces of the cards. Each respective transceiver module is connected to an end of a respective optical fiber ribbon cable comprising a plurality of optical fibers, at least some of which are transmit fibers and at least some of which are receive fibers. Each of the transceiver modules comprises one or both of light sources and photodetectors. Each light source is configured to generate optical transmit signals by converting electrical transmit signals from an electrical domain to an optical domain. Each photodetector is configured to generate an electrical receive signal by converting an optical receive signal from the optical domain to the electrical domain. Each respective transceiver module comprises a respective optics system for coupling the optical signals between the respective transceiver modules and the ends of the optical fibers. Each of the first and second groups of transceiver modules is configured to simultaneously transmit the optical transmit signals and receive the optical receive signals at a rate equal to or greater than approximately one Tb/s in both directions.

The invention also provides a method for transmitting and receiving data in an optical transceiver system having a plurality of parallel optical transceiver modules. The method comprises transmitting optical transmit signals at a rate equal to or greater than approximately one Tb/s and receiving optical receive signals at a rate equal to or greater than approximately one Tb/s. The transceiver system comprises a circuit board card and a plurality of parallel optical transceiver modules. The circuit board comprises a substrate having an upper surface and a lower surface having electrical conductors disposed thereon. At least some of the electrical conductors disposed on the upper surface are electrically connected with at least some of the electrical conductors disposed on the lower surface. The plurality of parallel optical transceiver modules are mechanically coupled to the upper surface of the card.

These and other features and advantages of the invention will become apparent from the following description, drawings and claims.

DETAILED DESCRIPTION OF AN ILLUSTRATIVE EMBODIMENT

In accordance with the invention, an optical transceiver system is provided that comprises multiple parallel transceiver modules that are mounted on a card. The transceiver card is small in terms of spatial dimensions, has very good heat dissipation characteristics, and is capable of simultaneously transmitting and receiving data at a rate equal to or greater than approximately 1 Tb/s. A plurality of the transceiver systems may be interconnected to achieve a communications hub system having even higher bandwidths. In addition, the transceiver system may be configured such that each card has a routing controller mounted thereon for performing router functions. The router functions include, for example: causing signals received by one transceiver module on the card to be routed to and transmitted by another of the transceiver modules; causing signals received by one transceiver module on the card to be retransmitted by the same transceiver module over one of its optical transmit channels; and causing signals received by one transceiver module on the card to be routed to and transmitted by a transceiver module on a different card. These and other illustrative, or exemplary, embodiments will now be described with reference to FIGS. 2-10.

Figure 2:
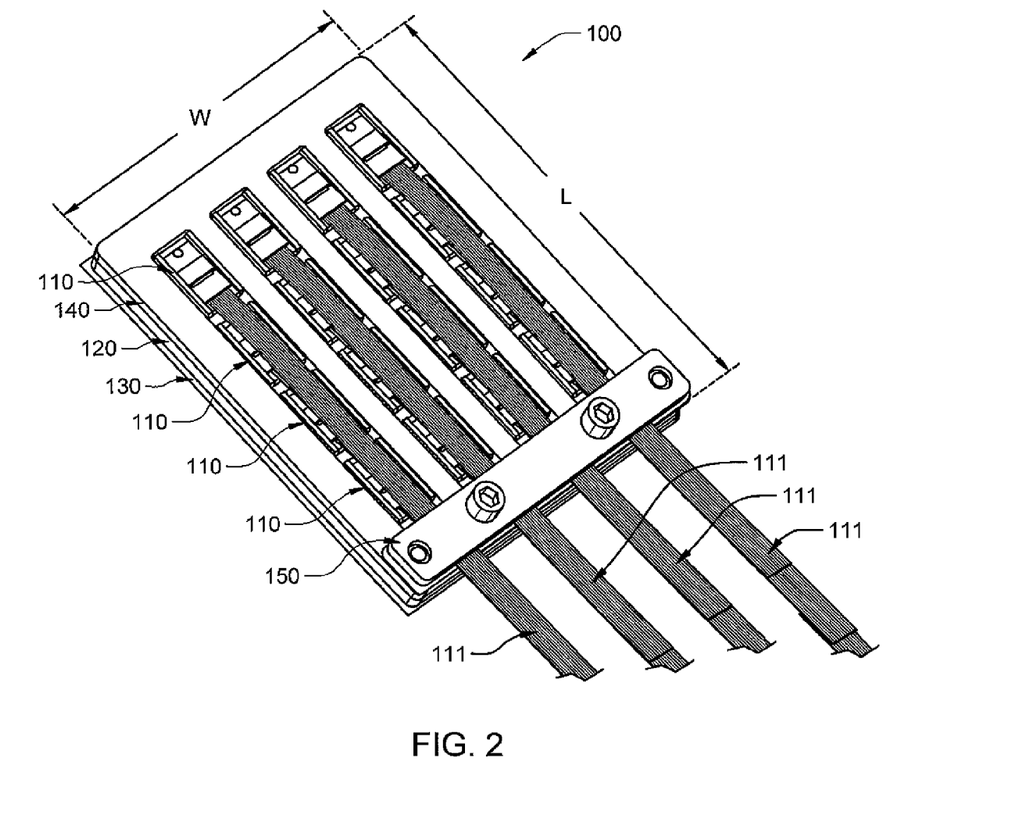
FIG. 2 illustrates a top perspective view of the transceiver system in accordance with an embodiment of the invention.

FIG. 2 illustrates a top perspective view of the transceiver system 100 in accordance with an embodiment. The transceiver system 100 includes at least sixteen parallel transceiver modules 110, sixteen respective leadframes 120 on which respective transceiver modules 110 are mounted in a generally planar array, a PCB card 130 to which the leadframes 120 are attached, and a heat sink device 140 attached to the respective leadframes 120. The PCB card comprises a substrate material having electrical connections on upper and lower surfaces thereof, as will be described in more detail below with reference to FIGS. 3-10. Each of the transceiver modules 110 mounted on the card 130 receives a respective optical fiber ribbon cable 111 comprising twelve optical fibers. Thus, the transceiver system 100 is optically coupled to sixteen optical fiber ribbon cables 111. A strain relief device 150 holds the fiber ribbon cables 111 firmly in place to prevent wiggle loss from occurring in the event that forces external to the transceiver system are exerted on the cables 111.

In accordance with one embodiment, each transceiver module 110 transmits and receives data over multiple transmit and multiple receive channels, respectively. Alternatively, eight of the transceiver modules 111 are used to transmit, but not receive, data and the other eight of the transceiver modules 111 are used to receive, but not transmit, data. In the former case, each of the ribbon cables 111 comprises six transmit and six receive optical fibers. In the latter case, six of the ribbon cables 111 comprise six transmit optical fibers and the other six ribbon cables 111 comprise six receive optical fibers. In either case, each transceiver module 110 has twelve channels, each of which has a bandwidth of ten gigabits per second (Gb/s). Therefore, the term "optical transceiver module", as that term is used herein, is intended to denote any of the following: (1) a module that transmits optical signals and receives optical signals; (2) a module that transmits optical signals, but does not receive optical signals; and (3) a module that receives optical signals, but does not transmit optical signals.

In cases in which a transceiver module 110 transmits and receives optical signals, the transceiver module 110 includes multiple (e.g., six) laser diodes and multiple (e.g., six) photodiodes. In cases in which a transceiver module 110 transmits, but does not receive, optical signals, the transceiver module 110 includes multiple (e.g., twelve) laser diodes and no photodiodes. In cases in which a transceiver module 110 receives, but does not transmit, optical signals, the transceiver module 110 includes multiple (e.g., twelve) photodiodes and no laser diodes. A variety of different types of laser diodes may be used for this purpose, including, for example, edge emitting laser diodes and vertical cavity surface emitting laser diodes (VCSELs). The invention is not limited with respect to the types of laser diodes or photodiodes that are used for this purpose. In addition, it may be possible to use light sources other than laser diodes to generate optical signals, such as light emitting diodes (LEDs). Likewise, it may be possible to use photodetectors other than photodiodes to detect the received optical signals. For ease of illustration, the laser diodes and photodiodes are not shown in the figures.

The transceiver system 100 has a simultaneous transmit bandwidth of at least approximately 1 Tb/s and a receive bandwidth of at least approximately 1 Tb/s. The transmit bandwidth is calculated as follows: 8 transceiver modules×12 channels per module×10 Gb/s=$0.96 \times 10^{12}$, which is considered in the optical transceiver industry to be 1 Tb/s. The receive bandwidth is calculated in the same manner. The transceiver system 100 is extremely small considering its high bandwidth. For example, the card 130 typically has a length, L, of about 2 inches (about 51 mm) and a width, W, of about 1.5 inches (about 38 mm). The known Snap 12 host PCB described above typically has similar dimensions, but has a transmit bandwidth of only about 100 Gb/s and a receive bandwidth of only about 100 Gb/s. Consequently, approximately ten of the known Snap 12 transceiver systems would be needed to provide the same amount of bandwidth as that provided by the transceiver system 100 shown in FIG. 2. Therefore, the amount of space consumed by the transceiver system 100 is at least an order of magnitude (e.g., $\frac{1}{10}^{nth}$) less than that which would be consumed if the known Snap 12 technology were used to achieve the same bandwidth.

Figure 3:
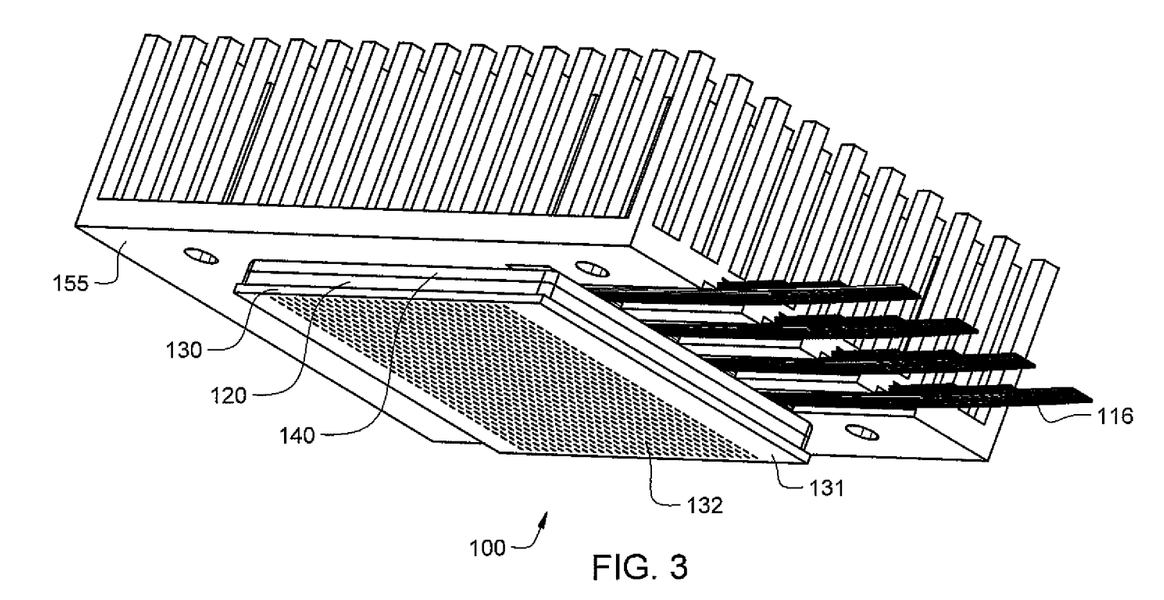
FIG. 3 illustrates a bottom perspective view of the transceiver system shown in FIG. 2 having an additional heat sink device attached to it.

FIG. 3 illustrates a bottom perspective view of the transceiver system 100 shown in FIG. 2 having a heat sink device 155 attached to it. Because of the large number of transceiver modules 110 (FIG. 2) that are included in the transceiver system 100, the heat dissipation characteristics of the system 100 need to be such that large amounts of heat can be adequately dissipated. The heat sink device 155 normally is not part of the transceiver system 100, but is provided by the customer. The heat sink device 155 is in mechanical and thermal contact with the heat sink device 140 of the transceiver system 100. The heat sink device 140 is secured to the leadframes 120 by a thermally conductive adhesive material, such as a thermally conductive epoxy. The direction of heat flow is as follows: heat generated by the transceiver modules 110 flows into the respective leadframes 120, then from the leadframes 120 through the thermally conductive epoxy into the heat sink device 140, and then from the heat sink device 140 into the customer heat sink device 155. In accordance with this embodiment, the heat sink device 140 does not absorb any of the heat, but only conducts the heat into the heat sink device 155. The heat that passes into the heat sink device 155 is then dissipated through convection.

The lower surface 131 of the PCB card 130 comprises a land grid array (LGA), which comprises I/O pads 132 that are in electrical contact with I/O pins (not shown) of a motherboard (not shown) when the transceiver system 100 is mounted on the motherboard, as will be described below in more detail with reference to FIG. 7. Each of the transceiver modules 110 has two conductive high-speed I/O lines per channel. Therefore, the transceiver system 100 has a total of 384 high-speed I/O lines (16 modules×12 channels per module×2 I/O lines per channel=384). The LGA has at least 384 I/O pads for interfacing with the 384 I/O lines of the transceiver system 100. The LGA may be, for example, a commercially available 30×30 array of I/O pads (total of 900 I/O pads), which is a much larger number of I/O pads than the number of I/O pads actually needed.

The leadframes 120 preferably are secured to an upper surface of the card 130 with a re-workable adhesive, such as a thermal plastic adhesive. Electrical contacts of the leadframes 120 are wire bonded to electrical contacts on the card 130, which, in turn, are electrically connected by conductive lands of the LGA to the conductive pads 132 of the LGA. The transceiver modules 110 are attached to their respective leadframes 120 with an adhesive material, such as epoxy, for example. Securing the leadframes 120 to the card 130 with a thermal plastic adhesive enables any of the transceiver modules 110 to be easily lifted off of the card 130 and replaced with another transceiver module 110. This feature of the invention allows defective transceiver modules 110 to be easily replaced, which allows the transceiver system 100 to be manufactured with a very high yield.

Figure 4:
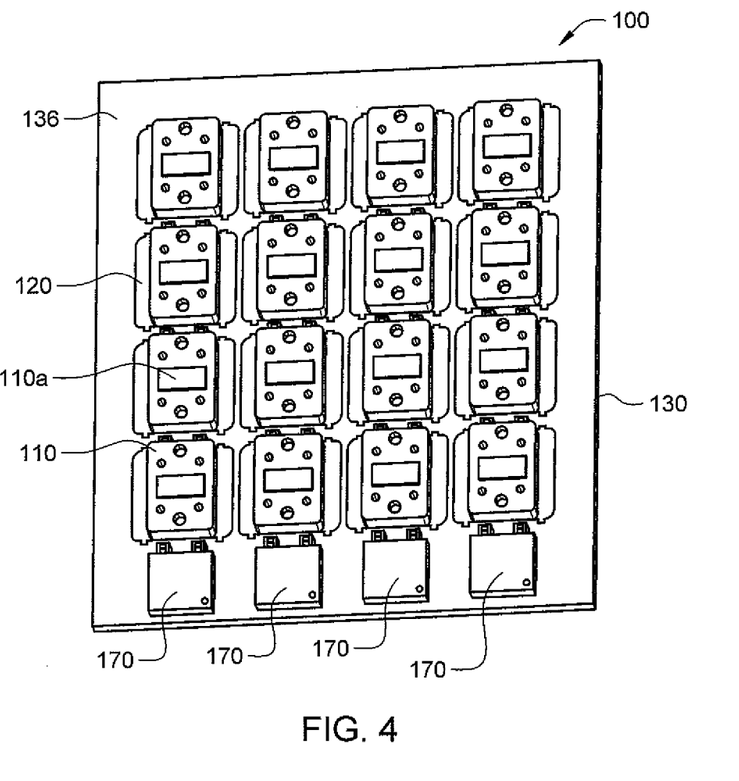
FIG. 4 illustrates a top perspective view of the transceiver system shown in FIG. 3, but with the heat sink devices shown in FIG. 3 removed.

FIG. 4 illustrates a top perspective view of the transceiver system 100 shown in FIGS. 2 and 3, but with the heat sink devices 140 and 155 removed. As stated above with reference to FIG. 1, the known parallel transceiver module 2 typically includes a transceiver controller 6 that controls the operations of the transceiver module 2. The transceiver controller 6 is typically an IC that is part of the transceiver module 2. The transceiver controller 6 performs various functions including, for example, monitoring the output power levels of the laser diodes, controlling the bias currents of the laser diodes to maintain constant average output power levels for the laser diodes, recovering bits contained in the signals received over the receive optical fibers, and forwarding those bits to other circuitry within or external to the transceiver module.

In accordance with an embodiment of the invention, the transceiver controllers are ICs that are external to the transceiver modules 110 that they control. In particular, in accordance with the embodiment depicted in FIG. 4, the transceiver system 100 includes four transceiver controllers 170. Each of the transceiver controllers 170 is an IC that controls four of the sixteen transceiver modules 110. The controller ICs 170 are attached with adhesive to the upper surface 136 of the PCB card 130. The electrical I/O pads of the controller ICs 170 are wire bonded to electrical contacts on the upper surface 136 of the card 130. Each of the controller ICs 170 performs the typical types of controller functions described above, but for multiple transceiver modules 110. The controller ICs 170 will typically already be attached and wire bonded to the card 130 prior to the transceiver modules 110 and the heat sink devices 140 and 155 being secured to the transceiver system 100. Each of the transceiver modules 110 includes an optics system 110A that couples light from the laser diodes (not shown) onto the transmit fiber ends (not shown) and from the receive fiber ends (not shown) onto the photodiodes (not shown).

Figure 5:
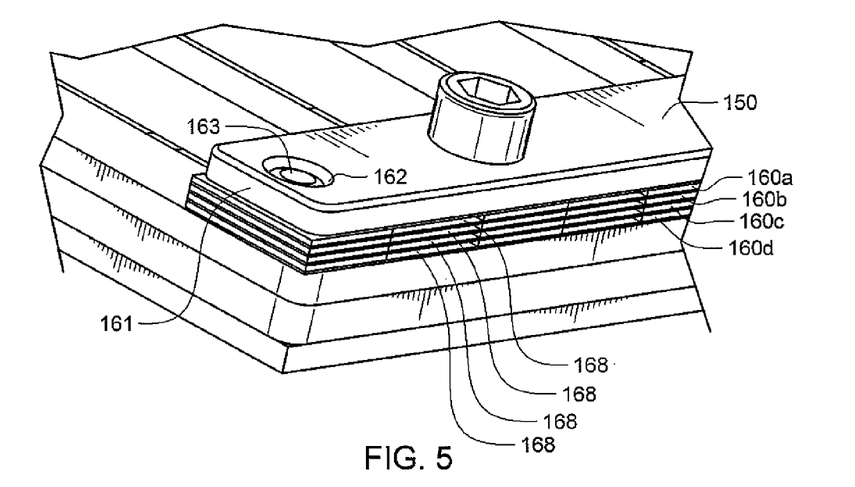
FIG. 5 illustrates a close-up perspective view of the transceiver system shown in FIG. 2 that illustrates the structure of the strain relief device of the transceiver system in accordance with an embodiment.
Figure 6:
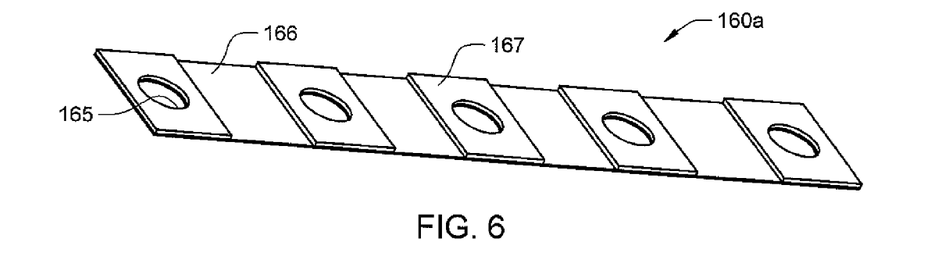
FIG. 6 illustrates a top perspective view of one leaf of the strain relief device shown in FIG. 5.

FIG. 5 illustrates a close-up perspective view of the transceiver system 100 shown in FIG. 2, which illustrates the structure of the strain relief device 150 in accordance with an embodiment. FIG. 6 illustrates a top perspective view of one of the leafs 160A of the strain relief device 150. In accordance with this embodiment, the strain relief device 150 includes four leafs 160A-160D between which the ribbon cables 111 (FIG. 2) are sandwiched. The strain relief device 150 includes an upper bar 161 that attaches to the uppermost leaf 160A. The upper bar 161 has one or more openings 162 formed therein that are shaped and sized to receive one or more respective fasteners 163, such as pins, screws, bolts, etc. The leafs 160A-160D have openings 165 formed therein that are aligned with the openings 162 formed in the upper bar 161. To lock the strain relief device 150 to the transceiver system 100, the fastening devices 163 pass through the openings 162 and 165 into the heat sink device 140, which has openings (not shown) formed therein for receiving the ends of the fastening devices 163. The fastening devices 163 may be, for example, pins, screws, or bolts.

The leafs 160A-160D will typically be made of two layers of material 166 and 167. The material used for this purpose may be, for example, Kapton. Kapton is a strong, lightweight plastic material that is resistant to high temperatures. Kapton is often used to make two-layer flex circuits. In accordance with an embodiment, the leafs 160A-160D are made in the same manner in which a Kapton flex circuit would be made, which is known to persons skilled in the art. However, unlike a Kapton flex circuit, the leafs 160A-160D typically would not include electrical circuitry. Because layer 166 is thinner than layer 167, when the leafs 160A-160D are stacked on top of one another in the manner shown in FIG. 5, spaces 168 exist between the leafs 160A-160D. The fiber ribbon cables 111 shown in FIG. 2 are gripped within the spaces 168 between pairs of adjacent leafs 160A-160D. The leafs 160A-160D are deformable, or crunchable, so that the ribbon cables 111 are tightly gripped within the spaces 168 between the leafs 160A-160D without damaging the fibers of the ribbons 111.

Figure 7:
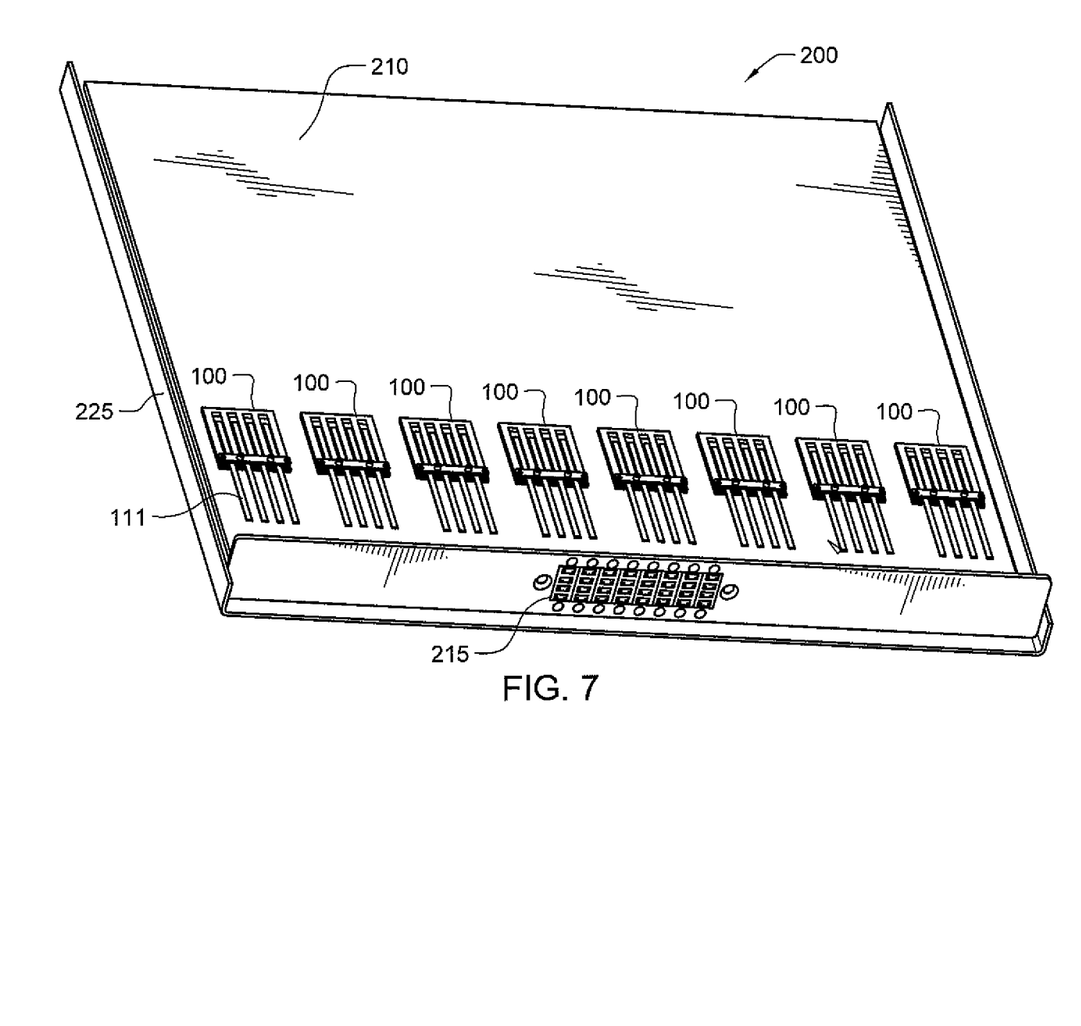
FIG. 7 illustrates a top perspective view of a communications hub system that includes a motherboard on which several of the transceiver systems shown in FIG. 2 are mounted.

FIG. 7 illustrates a top perspective view of a communications hub system 200 that includes a motherboard 210 and several of the transceiver systems 100 shown in FIG. 2. The transceiver systems 100 are mounted on the motherboard 210 and the LGAs located on the cards 130 are electrically interconnected to electrical connections on the motherboard 210. The motherboard 210 is typically a PCB or a printed wiring board (PWB). In this illustrative embodiment, eight of the transceiver systems 100 are mounted on the motherboard 210. There are sixteen optical fiber ribbon cables 111 associated with each of the transceiver systems 100. Thus, there are a total of 128 optical fiber ribbon cables 111 connected to the system 200. Each ribbon cable 111 is connected to a front panel 215 on an end of the cable 111 opposite the end of the cable that connects to the transceiver system 100. The front panel 215 is part of a housing 225 (e.g., a box) that houses the communications hub system 200. Only the lower portion of the housing 225 is shown in FIG. 7.

Figure 8:
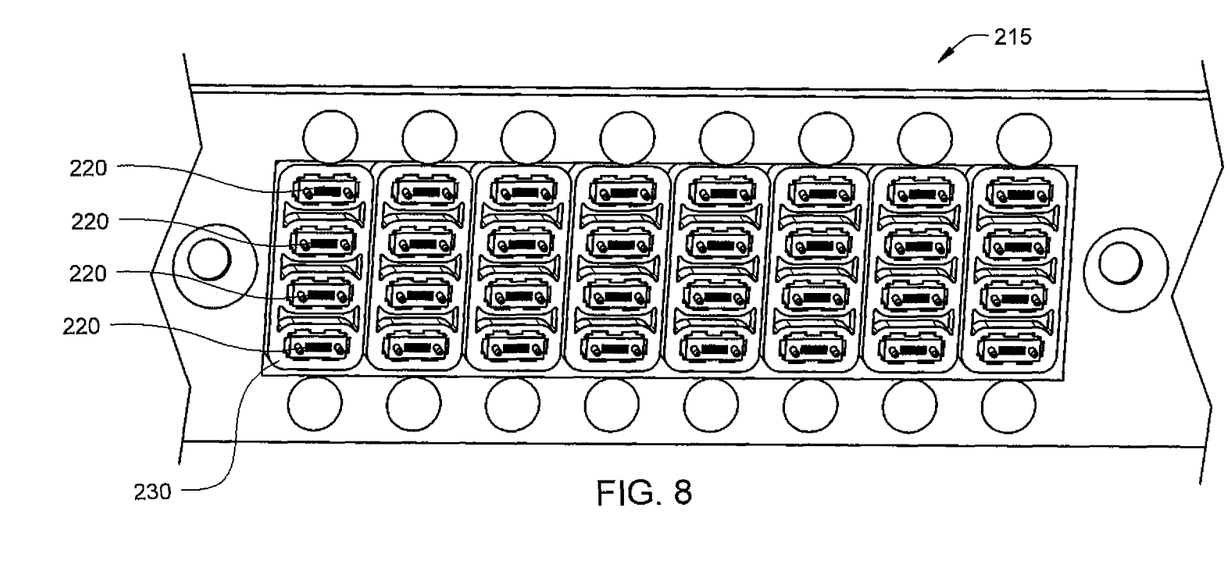
FIG. 8 illustrates a front perspective view of the panel of the communications hub system shown in FIG. 7.

FIG. 8 illustrates a front perspective view of the panel 215 shown in FIG. 7. The panel 215 has slots formed therein that contain optical receptacles 220. Each of the optical receptacles 220 is configured to mate with a respective optical connector (not shown). Each of the optical receptacles 220 connects to four of the 12-fiber ribbon cables 111. Each column 230 of receptacles 220 connects to the sixteen optical fiber ribbon cables 111 associated with a respective one of the transceiver systems 100. Each optical connector (not shown) that connects to one of the receptacles 220 also holds the ends of four optical fiber ribbon cables (not shown). Optics systems (not shown) in the receptacles 220 and/or in the connectors (not shown) couple the light between the ends of the fibers of the ribbon cables 111 into the ends of the respective fibers of the respective ribbon cables held in the respective connectors.

In the illustrative embodiment represented by FIGS. 7 and 8, eight Tb/s of data are capable of being transmitted while eight Tb/s of data are received. Thus, it can be seen that the hub system 200 is massively parallel in terms of its ability to simultaneously transmit and receive extremely large quantities of data at a very high rate of speed. In addition, because the transceiver systems 100 are very small in terms of spatial dimensions, the hub system 200 is also very small in terms of spatial dimensions when considering the extremely large bandwidth of the system 200.

Figure 9:
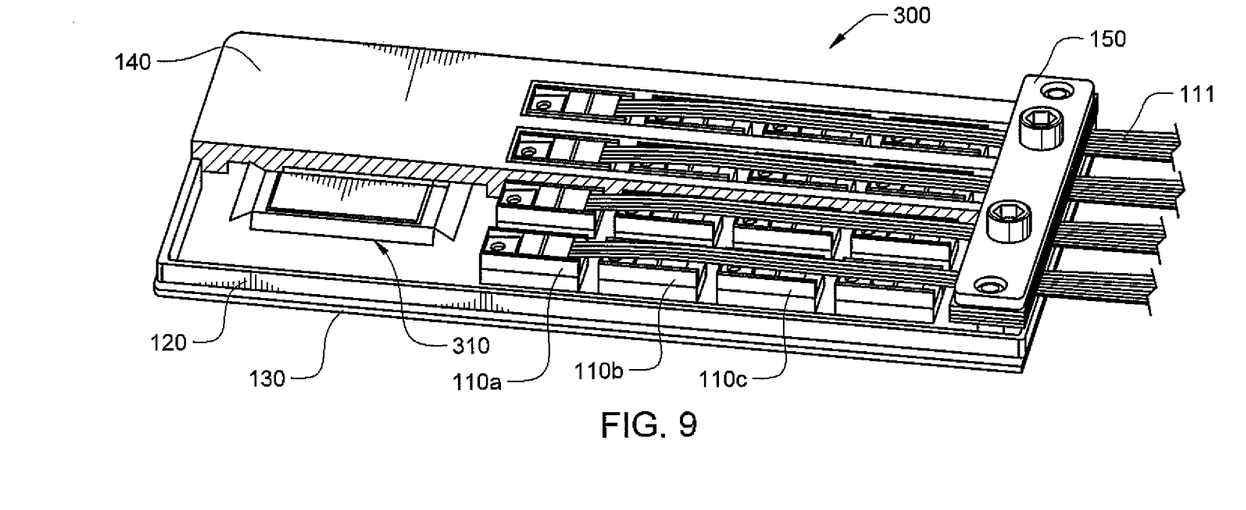
FIG. 9 illustrates a top perspective view of the transceiver system in accordance with another embodiment, wherein the transceiver system is configured to function as a router system.

FIG. 9 illustrates a top perspective view of the transceiver system in accordance with another embodiment, wherein the transceiver system is configured to function as a router system 300. The router system 300 is essentially identical to the transceiver system 100 described above with reference to FIGS. 2-7, except that unlike the transceiver system 100, the router system 300 includes a routing controller 310. The routing controller 310 is typically an application specific integrated circuit (ASIC) configured with hardware and firmware to perform routing functions. Processor types other than ASICs can also be used for this purpose. In FIG. 9, a section of the heat sink device 140 has been removed for illustrative purposes. In FIGS. 2-7 and 9, like numerals represent like elements.

The router system 300 includes sixteen of the transceiver modules 110 (FIGS. 2 and 3) and four transceiver controller ICs 170 (FIG. 4). The transceiver controller ICs 170 control the transceiver functions of the sixteen transceiver modules 110. In addition, the router system 300 includes a routing controller 310 that performs routing functions that are not performed by the transceiver controller ICs 170. For example, with reference to FIG. 9, the routing controller 310 may cause signals received by one transceiver module 110A mounted on the card 130 to be routed to and transmitted by one or more other transceiver modules, e.g., 110B and/or 110C, mounted on the same card 130. Alternatively, the routing controller 310 may cause signals received by one transceiver module 110A mounted on the card 130 to be retransmitted by the same transceiver module 110A over one or more of its own optical transmit channels. Alternatively, if the system 200 shown in FIG. 7 is equipped with the routing controller 310, the routing controller 310 may cause signals received by one transceiver module 110 mounted on the motherboard 210 to be routed to and transmitted by one or more other transceiver modules 110 mounted on one or more other cards 130. As will be understood by persons skilled in the art, other scenarios are also possible.

In typical known router systems, optical signals that are received in each of the transceiver modules are converted into electrical signals and sent to one or more router controller ICs, which are external to the transceiver modules. The external router controller ICs analyze the signals to obtain routing information and then cause the signals to be sent to the appropriate transceiver modules for conversion back into the optical domain and then transmitted on to the next destination. Therefore, all of the signals received in a given transceiver module are exported from the transceiver module to the router controller ICs. Consequently, in known high-density router systems, an extremely large number of I/O ports are needed on the PCB and motherboard to accommodate all of these signals.

However, in known router systems, only about 20% of the signals received in a given transceiver module are not processed locally. In other words, about 80% of the signals that are received on optical receive channels of a given transceiver module are routed to optical transmit channels of either the same transceiver module or of a different transceiver module located on the same PCB. In accordance with the invention, it has been determined that placing a routing controller 310 on the same card 130 on which multiple transceiver modules 110 are mounted enables the number of I/O ports on the card 130 and on the motherboard to be dramatically reduced. Therefore, in accordance with this embodiment, the majority of the signals that are received by a given transceiver module 110 are never exported off of the card 130 on which that module 110 is mounted. Rather, the majority of the signals that are received by a given transceiver module 110 are processed by the routing controller 310 located on the same card 130 and then routed back to the same transceiver module 110 or to a different transceiver module 310 located on the same card 130 for transmission. This feature of the invention allows the router system 300 to be highly efficient in terms of space consumption, heat dissipation and costs. The dimensions of the router system 300 are essentially the same as those of the transceiver system 100 shown in FIG. 2, except that the length of the router system 300 is typically about 0.75 inches (about 19 mm) greater than the length, L, of the transceiver system 100 shown in FIG. 2. Additionally, because most of the signals travel shorter distances, routing is performed more quickly, which improves bandwidth efficiency. Also, because signals are routed over shorter distances, noise and electromagnetic interference (EMI) are reduced.

Figure 10:
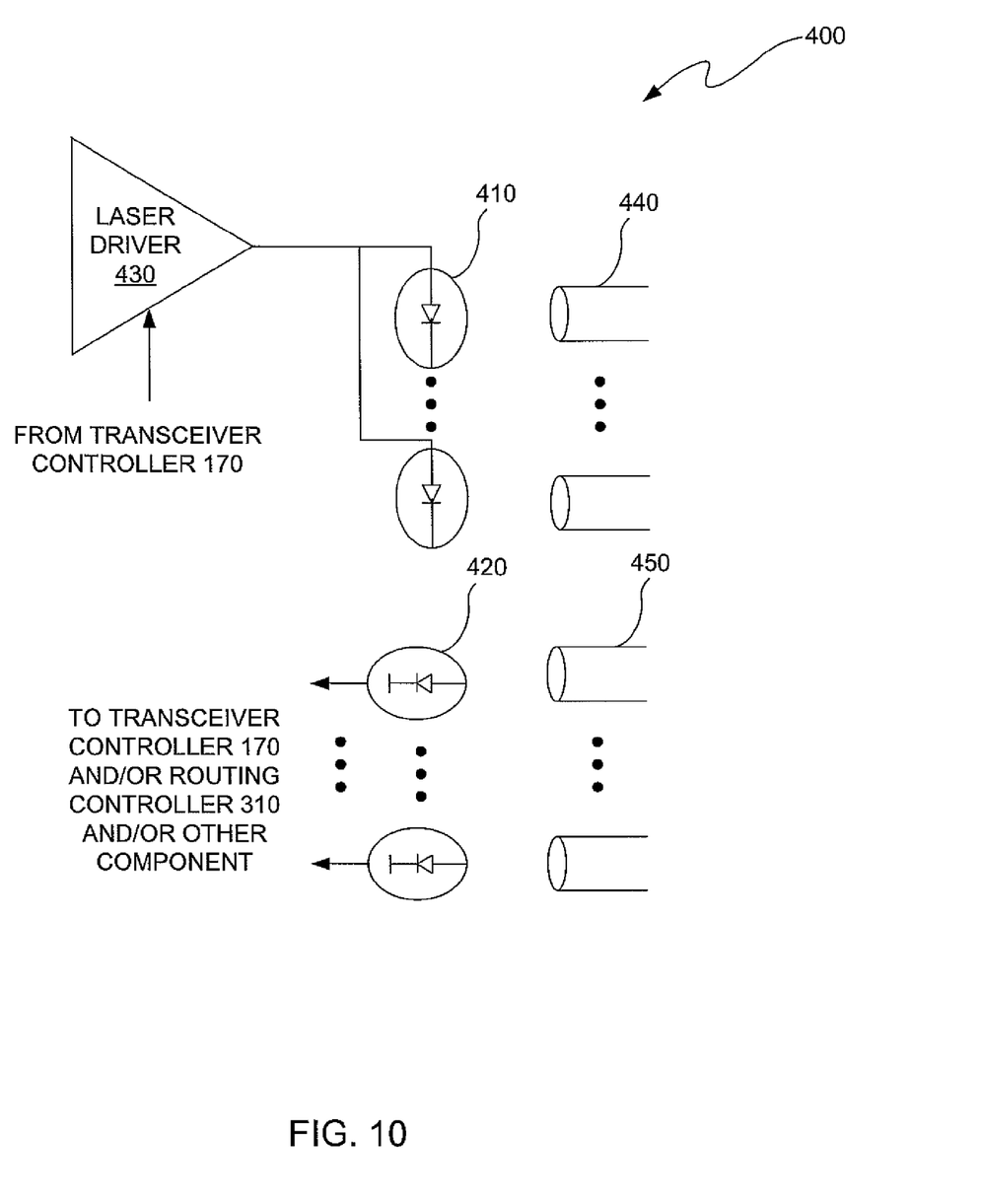
FIG. 10 illustrates a block diagram of transceiver module circuitry of the transceiver modules shown in FIG. 4 in accordance with an embodiment.

FIG. 10 illustrates a block diagram of transceiver module circuitry 400 of the transceiver modules 110 shown in FIG. 4 in accordance with an embodiment. In accordance with this embodiment, the transceiver circuitry 400 includes both laser diodes 410 and photodiodes 420. As stated above, each transceiver module 110 (FIG. 4) may include: (1) both laser diodes and photodiodes, in which case the transceiver module performs transmit and receive functions; (2) laser diodes, but no photodiodes, in which case the transceiver module performs transmit functions, but not receive functions; and (3) photodiodes, but no laser diodes, in which case the transceiver module performs receive functions, but not transmit functions. In the embodiment represented by FIG. 10, the transceiver module performs transmit and receive functions.

The transceiver module circuitry 400 includes at least one laser driver 430 that generates electrical signals that drive the laser diodes 410. The laser driver 430 receives electrical signals from the transceiver controller ICs 170 (FIG. 4) that control the bias currents, or the bias and modulation currents, of the laser diodes 410. As stated above, each transceiver module that performs transmit functions typically includes six or twelve laser diodes 410. The laser diodes 410 generate optical transmit signals that are coupled by the optics system (110A in FIG. 4) of the transceiver module onto the ends of respective transmit fibers 440. There may be, for example, two laser drivers 430, with each laser driver 430 driving a different group of the laser diodes 410. Each transceiver module that performs receive functions typically includes six or twelve photodiodes 420. The photodiodes 420 receive light coupled by the optics system (110A in FIG. 4) from the ends of respective receive fibers 450 onto the respective photodiodes. The photodiodes 420 convert the received light into electrical signals. These electrical signals may be output to the associated transceiver controller IC 170 (FIG. 4) and/or to the associated routing controller IC 310 (FIG. 9) and/or to some other component (not shown) that may or may not be mounted on the same card 130 (FIG. 4).

It should be noted that the invention has been described with respect to illustrative embodiments for the purpose of describing the principles and concepts of the invention. The invention is not limited to these embodiments. For example, while the invention has been described with reference to using particular optical components to control the optical path between the transceiver and connector modules, the invention is not limited to these components or to the overall configuration of the optical path. As will be understood by those skilled in the art in view of the description being provided herein, modifications may be made to the embodiments described to provide a system that achieves the goal of the invention, and all such modifications are within the scope of the invention.

What is claimed is:

1. An optical transceiver system for simultaneously transmitting multiple optical signals and receiving multiple optical signals, the optical transceiver system comprising:

a circuit board card comprising a substrate having an upper surface and an opposing lower surface, the upper and lower surfaces having electrical conductors disposed thereon, wherein at least some of the electrical conductors disposed on the upper surface are electrically connected with at least some of the electrical conductors disposed on the lower surface;

a plurality of separate parallel optical transceiver modules mechanically coupled to the upper surface of the card, each of the separate transceiver modules having electrical contacts that are electrically coupled to at least some of the electrical conductors disposed on the upper surface of the card;

a plurality of separate transceiver controllers mounted on the card, each of the separate transceiver controllers electrically connected to more than one of the plurality of separate parallel optical transceiver modules;

a router controller mounted on the card and electrically connected to at least some of the electrical conductors disposed on the upper surface of the card, the router controller operable to cause an optical receive signal received by a first of the separate parallel optical transceiver module to be retransmitted as an optical transmit signal by one or more of the plurality of separate parallel optical transceiver modules; and plurality of optical fiber ribbon cables, each optical fiber ribbon cables comprising a plurality of optical fibers, at least some of the optical fibers being optical transmit fibers and at least some of the optical fibers being optical receive fibers, wherein each separate transceiver module is connected to an end of a different one of the plurality of optical fiber ribbon cables: each of the separate transceiver modules coupled to the upper surface of the card-comprises a plurality of opto-electronic conversion devices, each opto-electronic conversion device comprising one of a light source and a photodetector, each separate transceiver module further comprises a respective optics system for coupling the optical signals between each of the separate transceiver modules and the ends of the optical fibers of the respective ribbon cable connected to the transceiver module, and wherein the transceiver system is configured to simultaneously transmit the optical transmit signals at a rate equal to or greater than approximately one terabit per second (Tb/s) and receive the optical receive signals at a rate equal to or greater than approximately one.

2. The optical transceiver system of claim 1, wherein said plurality of separate parallel optical transceiver modules corresponds to at least sixteen parallel optical transceiver modules, and wherein each of the plurality of optical fiber ribbon cables comprises at least twelve optical fibers, and wherein optical transmit signals and optical receive signals are transmitted and received, respectively, at a rate equal to or greater than approximately ten gigabits per second (Gb/s).

3. The optical transceiver system of claim 2, wherein eight of the separate optical transceiver modules include twelve of said light sources and none of said photodetectors, and wherein eight of the optical transceiver modules include twelve of said photodetectors and none of said light sources, wherein each of the plurality of optical fiber ribbon cables that connects to one of the separate optical transceiver modules having light sources has twelve of the transmit optical fibers, and wherein each of the plurality of optical fiber ribbon cables that connects to one of the separate optical transceiver modules having photodetectors has twelve of the receive optical fibers.

4. The optical transceiver system of claim 2, wherein eight of the separate optical transceiver modules include at least six of said light sources and at least six of said photodetectors, and wherein eight of the separate optical transceiver modules include at least six of said photodetectors and at least six of said light sources, wherein each of the plurality of optical fiber ribbon cables that connects to one of the separate optical transceiver modules has at least six of the transmit optical fibers and at least six of the receive optical fibers.

5. The optical transceiver system of claim 1, further comprising:
a leadframe device, the transceiver modules being attached to the leadframe device, the leadframe device mechanically coupling the optical transceiver modules to the upper surface of the card and electrically coupling at least some of the electrical contacts of the transceiver modules with at least some of the conductors disposed on the upper surface of the card.

6. The optical transceiver system of claim 5, wherein the leadframe device comprises a plurality of individual leadframes, each transceiver module being attached to a respective one of the leadframes, each leadframe comprising electrical contacts, at least some of the electrical contacts of each leadframe being electrically connected with at least some of the electrical contacts of each respective transceiver module.

7. The optical transceiver system of claim 6, wherein the leadframes are attached to the upper surface of the card with a re-workable adhesive material selected from a group of adhesive materials comprising at least one thermal plastic adhesive material.

8. The optical transceiver system of claim 6, further comprising:
a heat sink device attached to the leadframes for removing heat from the transceiver modules.

9. The optical transceiver system of claim 8, wherein the heat sink device is attached to the leadframes by a thermally conductive adhesive material.

10. The optical transceiver system of claim 5, wherein:
the plurality of separate transceiver controllers comprises at least four transceiver controllers mounted on the upper surface of the card and electrically connected to at least some of the conductors disposed on the upper surface of the card.

11. The optical transceiver system of claim 10, wherein each transceiver controller controls transceiver functions associated with at least four of the transceiver modules.

12. The optical transceiver system of claim 2, wherein the card is approximately 1.5 inches in width and approximately 2.0 inches in length.

13. The optical transceiver system of claim 10, wherein:
the routing controller is mounted on the upper surface of the circuit board card, the router controller operable to cause the optical receive signal received in the first one of the transceiver modules to be retransmitted as the optical transmit signal by a different one of the transceiver modules.

14. The optical transceiver system of claim 13, wherein the card is approximately 1.5 inches in width and approximately 2.75 inches in length.

15. An optical communications hub system for simultaneously transmitting multiple optical signals and receiving multiple optical signals, the optical communications hub system comprising:
at least first and second circuit board cards in communication with each other, each card comprising a substrate having an upper surface and an opposing lower surface, the upper and lower surfaces having electrical conductors disposed thereon, wherein at least some of the electrical conductors disposed on the upper surfaces of the first and second cards are electrically connected with at least some of the electrical conductors disposed on the lower surfaces of the first and second cards, respectively;

at least first and second groups of multiple separate parallel optical transceiver modules mechanically coupled to the upper surfaces of the first and second cards, respectively, each of the separate transceiver modules having electrical contacts that are electrically coupled to at least some of the electrical conductors disposed on the upper surfaces of the cards at least first and second groups of separate transceiver controllers mounted on the first and second circuit board cards respectively, each of the first and second groups of transceiver controllers electrically connected to more than one of the optical transceiver modules;

a first and second router controller mounted on the first and second circuit board cards respectively and electrically connected to at least some of the electrical conductors disposed on the upper surface of the first and second circuit board cards respectively, each of the first and second router controllers operable to perform routing functions, the routing functions including causing an optical receive signal received by a first one of the separate parallel optical transceiver module to be retransmitted as an optical transmit signal by one or more of the separate parallel optical transceiver modules; and a plurality of optical fiber ribbon cables, each optical fiber ribbon cables comprising a plurality of optical fibers, at least some of the optical fibers being optical transmit fibers and at least some of the optical fibers being optical receive fibers, wherein each separate transceiver module is connected to an end of a different one of the plurality of optical fiber ribbon cables each of the separate transceiver modules comprising a plurality of opto-electronic conversion devices enclosed within a package, each opto-electronic a photodetector, each separate transceiver module further comprises a respective optics system for coupling the optical signals between each of the separate transceiver modules and the ends of the optical fibers of the respective ribbon cable connected to the transceiver module, and wherein each of the first and second groups of separate transceiver modules system is configured to simultaneously transmit the optical transmit signals at a rate equal to or greater than approximately one terabit per second (Tb/s) and receive the optical receive signals at a rate equal to or greater than approximately one Tb/s.

16. The optical communications hub system of claim 15, wherein the first and second groups of separate transceiver modules each comprise at least sixteen parallel optical transceiver modules, and wherein each of the plurality of optical fiber ribbon cables comprises at least twelve optical fibers, and wherein optical transmit signals and optical receive signals are transmitted and received, respectively, at a rate of approximately ten gigabits per second (Gb/s).

17. The optical communications hub system of claim 16, wherein eight of the optical transceiver modules of each of the first and second groups of separate transceiver modules include twelve of said light sources and none of said photodetectors, and wherein eight of the optical transceiver modules of each of the first and second groups of separate transceiver modules include twelve of said photodetectors and none of said light sources, wherein each of the plurality of optical fiber ribbon cables that connects to one of the separate optical transceiver modules having light sources has twelve of the transmit optical fibers, and wherein each of the plurality of optical fiber ribbon cables that connects to one of the separate optical transceiver modules having photodetectors has twelve of the receive optical fibers.

18. The optical communications hub system of claim 16, wherein eight of the optical transceiver modules of each of the first and second groups of separate transceiver modules include at least six of the light sources and at least six of the photodetectors, and wherein eight of the optical transceiver modules of the first and second groups of separate transceiver modules include at least six of the photodetectors and at least six of the light sources, wherein each of the plurality of optical fiber ribbon cables that connects to one of the separate optical transceiver modules has at least six of the transmit optical fibers and at least six of the receive optical fibers.

19. The optical communications hub system of claim 15, further comprising:
    first and second leadframe devices, the transceiver modules of said first and second groups being attached to the first and second leadframe devices, respectively, the first and second leadframe devices mechanically coupling the optical transceiver modules of said first and second groups to the upper surfaces of the first and second cards, respectively, the first and second leadframe devices electrically coupling at least some of the electrical contacts of the first and second groups of transceiver modules with at least some of the conductors disposed on the upper surfaces of the first and second cards, respectively.

20. The optical communications hub system of claim 19, wherein the first and second leadframe devices each comprise a plurality of individual leadframes, each transceiver module being attached to a respective one of the leadframes, each leadframe comprising electrical contacts, at least some of the electrical contacts of each leadframe being electrically connected with at least some of the electrical contacts of each respective transceiver module.

21. The optical communications hub system of claim 19, wherein the leadframes are attached to the upper surface of the card with a thermal plastic adhesive material.

22. The optical communications hub system of claim 19, further comprising:
    first and second heat sink devices attached to the first and second leadframe devices, respectively, for removing heat from the transceiver modules.

23. The optical communications hub system of claim 22, wherein the first and second heat sink devices are attached to the first and second leadframe devices by a re-workable adhesive material selected from a group of adhesive materials comprising at least one thermal plastic adhesive material.

24. The optical communications hub system of claim 19, wherein the at least first and second groups of separate transceiver controllers further comprises:
    at least four transceiver controllers mounted on the upper surface of the first card and electrically connected to at least some of the conductors disposed on the upper surface of the first card; and
    at least four transceiver controllers mounted on the upper surface of the second card and electrically connected to at least some of the conductors disposed on the upper surface of the second card.

25. The optical communications hub system of claim 24, wherein each transceiver controller controls transceiver functions associated with at least four of the transceiver modules.

26. The optical communications hub system of claim 15, wherein each of the cards is approximately 1.5 inches in width and approximately 2.0 inches in length.

27. The optical communications hub system of claim 24, wherein:

the first and second routing controllers are mounted on the upper surfaces of the first and second cards, respectively, and wherein the routing functions performed by each of the first and second routing further include (1) causing the optical receive signal received in the first one of the transceiver modules, comprising a transceiver module of the first group, to be retransmitted as the optical transmit signal by the same first transceiver module of the first group, (2) causing the optical receive signal received in the first one of the transceiver modules, comprising a transceiver module of the first group, to be retransmitted as the optical transmit signal by a different one of the transceiver modules of the first group, and (3) causing the optical receive signal received in the first one of the transceiver modules, comprising a transceiver module of the first group, to be retransmitted as the optical transmit signal by one of the transceiver modules of the second group.

28. The optical transceiver system of claim 27, wherein each of the first and second cards is approximately 1.5 inches in width and approximately 2.75 inches in length.

29. A method for simultaneously transmitting multiple optical signals and receiving multiple optical signals in an optical transceiver system, the method comprising:

in an optical transceiver system, transmitting optical transmit signals at a rate equal to or greater than approximately one terabit per second (Tb/s) and receiving optical receive signals at a rate equal to or greater than approximately one Tb/s, the transceiver system comprising:

a circuit board card and a plurality of separate parallel optical transceiver modules, each separate parallel optical transceiver module comprising a plurality of light sources and a plurality of photodetectors, the circuit board comprising a substrate having an upper surface and a lower surface, the upper and lower surfaces having electrical conductors disposed thereon, wherein at least some of the electrical conductors disposed on the upper surface are electrically connected with at least some of the electrical conductors disposed on the lower surface, and wherein the plurality of separate parallel optical transceiver modules are mechanically coupled to the upper surface of the card, a plurality of separate transceiver controllers mounted on the card, each of the separate transceiver controllers electrically connected to more than one of the plurality of separate parallel optical transceiver modules, a router controller mounted on the card and electrically connected to at least some of the electrical conductors disposed on the upper surface, the router controller operable to cause an optical receive signal received by a first of the separate parallel optical transceiver modules to be retransmitted as an optical transmit signal by one or more of the plurality of separate parallel optical transceiver modules, and a plurality of optical fiber ribbon cables, each optical fiber ribbon cables comprising a plurality of optical fibers, at least some of the optical fibers being optical transmit fibers and at least some of the optical fibers being optical receive fibers, wherein each separate transceiver module is connected to an end of a different one of the plurality of optical fiber ribbon cables.

30. The method of claim 29, wherein each of the separate transceiver modules has electrical contacts that are electrically coupled to at least some of the electrical conductors disposed on the upper surface of the card, each of the separate transceiver modules comprising one or both of light sources and photodetectors, each light source being configured to generate optical transmit signals comprising bits of data by converting electrical transmit signals comprising bits of data from an electrical domain to an optical domain, each photodetector being configured to generate an electrical receive signal comprising bits of data by converting an optical receive signal comprising bits of data from the optical domain to the electrical domain, each separate transceiver module further comprising a respective optics system for coupling the optical signals between the separate transceiver modules and the ends of the optical fibers of the respective ribbon cable connected to the transceiver module.

31. The method of claim 30, wherein said plurality of parallel optical transceiver modules corresponds to at least sixteen parallel optical transceiver modules, and wherein each optical fiber ribbon cable comprises at least twelve optical fibers, and wherein optical transmit signals and optical receive signals are transmitted and received, respectively, at a rate equal to or greater than approximately ten gigabits per second (Gb/s).

* * * * *